(12) United States Patent
Army et al.

(10) Patent No.: US 10,605,468 B2
(45) Date of Patent: Mar. 31, 2020

(54) FLOW SENSING OZONE CONVERTER WITH REPLACEABLE CORE

(71) Applicant: Hamilton Sundstrand Corporation, Charlotte, NC (US)

(72) Inventors: Donald E. Army, Enfield, CT (US); Gregory L. DeFrancesco, Simsbury, CT (US); Thomas M. Zywiak, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 79 days.

(21) Appl. No.: 15/824,378

(22) Filed: Nov. 28, 2017

(65) Prior Publication Data

US 2019/0162428 A1 May 30, 2019

(51) Int. Cl.
*F24F 3/12* (2006.01)
*B64D 13/06* (2006.01)
*F24F 110/74* (2018.01)

(52) U.S. Cl.
CPC ............... *F24F 3/12* (2013.01); *B64D 13/06* (2013.01); *B01D 2257/106* (2013.01); *B01D 2258/06* (2013.01); *B01D 2259/4575* (2013.01); *B64D 2013/0685* (2013.01); *F24F 2110/74* (2018.01)

(58) Field of Classification Search
CPC ......... F24F 3/12; F24F 2110/74; B64D 13/06; B64D 2013/0685; B01D 53/8675; G01F 1/34
See application file for complete search history.

(56) References Cited

U.S. PATENT DOCUMENTS

| 6,629,428 | B1 | 10/2003 | Murry |
| 6,688,184 | B2 | 2/2004 | Army, Jr. |
| 8,365,550 | B2 | 2/2013 | Vogel |
| 9,133,028 | B2 | 9/2015 | Army |
| 9,365,293 | B2 | 6/2016 | Steinmaier |
| 2004/0079060 | A1* | 4/2004 | Alward ............. B01D 39/2082 55/523 |
| 2015/0121909 | A1 | 5/2015 | Koenig |
| 2017/0191863 | A1 | 7/2017 | Army |
| 2017/0275164 | A1 | 9/2017 | Gao et al. |
| 2017/0283083 | A1* | 10/2017 | Behbahani-Pour .... B64D 25/00 |
| 2017/0296965 | A1* | 10/2017 | Schaeffer ............... B01D 53/30 |

FOREIGN PATENT DOCUMENTS

| EP | 2792400 A1 | 10/2014 |
| WO | 8101250 | 5/1981 |

OTHER PUBLICATIONS

European Search Report for Application No. 18208808.8-1010, dated Apr. 9, 2019, 7 Pages.

* cited by examiner

*Primary Examiner* — Timothy C Cleveland
(74) *Attorney, Agent, or Firm* — Cantor Colburn LLP

(57) ABSTRACT

A flow sensing ozone converter includes an inlet housing, an outlet housing, and an ozone converter core. The flow sensing ozone converter integrates flow sensing and oxygen removal components. The inlet housing is provided with an inlet housing flange. The outlet housing is provided with an outlet housing flange. The ozone converter core is at least partially received within the inlet housing. The ozone converter is provided with an ozone converter flange that abuts the inlet housing flange and the outlet housing flange.

14 Claims, 3 Drawing Sheets

FLOW SENSING OZONE CONVERTER WITH REPLACEABLE CORE

BACKGROUND

Exemplary embodiments pertain to the art of ozone converter for use with an aircraft environmental control system.

Aircraft may be provided with an environmental control system that provides conditioned air to a cabin and/or flight deck of the aircraft. The ambient air may be drawn from a compressor stage of an engine (a bleed air system), an air scoop, or a dedicated compressor. At higher altitudes (e.g., greater than 20,000 ft (6096 m)), the ambient air contains unacceptable levels of ozone ($O_3$). Passenger comfort and/or compliance with regulations or agreements may limit the amount of ozone provided to the cabin and flight deck. As such, commercial aircraft generally include an ozone converter that converts ozone to oxygen ($O_2$).

Ozone converters typically include an ozone-converting core that causes the ozone to decompose to oxygen.

BRIEF DESCRIPTION

Disclosed is a flow sensing ozone converter. The flow sensing ozone converter includes an inlet housing, an outlet housing, and an ozone converter core. The inlet housing extends between a first inlet housing end and a second inlet housing end having an inlet housing flange. The outlet housing extends between a first outlet housing end having an outlet housing flange and a second outlet housing end. The ozone converter core is at least partially received within the inlet housing. The ozone converter is provided with an ozone converter flange that abuts the inlet housing flange and the outlet housing flange.

In addition to one or more of the features described herein, the inlet housing, the outlet housing, and the ozone converter core are removably coupled to each other at the inlet housing flange, the ozone converter flange, and the outlet housing flange.

In addition to one or more of the features described herein, a flow sensor assembly is operatively connected to the inlet housing.

In addition to one or more of the features described herein, the flow sensor assembly includes a heat shield that is secured to the inlet housing.

In addition to one or more of the features described herein, the heat shield is at least partially disposed about the inlet housing.

In addition to one or more of the features described herein, the flow sensor assembly includes a first pressure sensor that is disposed on the heat shield.

In addition to one or more of the features described herein, an insulation blanket is disposed about the inlet housing and the outlet housing.

Also disclosed is a flow sensing ozone converter. The flow sensing ozone converter includes an inlet housing, an outlet housing, and an ozone converter core. The inlet housing extends between a first inlet housing end and a second inlet housing end. The outlet housing extends between a first outlet housing end and a second outlet housing end. The ozone converter core is removably coupled to at least one of the inlet housing and the outlet housing. The ozone converter core has an ozone converter flange that is disposed between the second inlet housing end and the first outlet housing end.

In addition to one or more of the features described herein, the ozone converter is at least partially disposed within the inlet housing.

In addition to one or more of the features described herein, the inlet housing is provided with an inlet housing flange that is disposed at the second inlet housing end.

In addition to one or more of the features described herein, the outlet housing is provided with an outlet housing flange that is disposed at the first outlet housing end.

In addition to one or more of the features described herein, the ozone converter flange is disposed between the inlet housing flange and the outlet housing flange.

In addition to one or more of the features described herein, the inlet housing includes an inlet section, an outlet section, and a diffuser section. The inlet section extends from the first inlet housing end towards the second inlet housing end. The outlet section extends from the second inlet housing end towards the first inlet housing end. The diffuser section extends between the inlet section and the outlet section.

In addition to one or more of the features described herein, a restriction section is disposed between the inlet section and the diffuser section.

In addition to one or more of the features described herein, the restriction section defines at least one pressure sense hole.

In addition to one or more of the features described herein, a heat shield is disposed about a portion of the inlet housing.

In addition to one or more of the features described herein, a first pressure sensor is disposed on a first portion of the heat shield.

In addition to one or more of the features described herein, a second pressure sensor disposed on a second portion of the heat shield that is disposed opposite the first portion.

In addition to one or more of the features described herein, the outlet housing includes a nozzle section and an outlet section. The nozzle section extends from the first outlet housing end towards a second outlet housing end. The outlet housing outlet section extends from the nozzle section to the second outlet housing end.

In addition to one or more of the features described herein, a temperature sensor that is operatively connected to the outlet housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
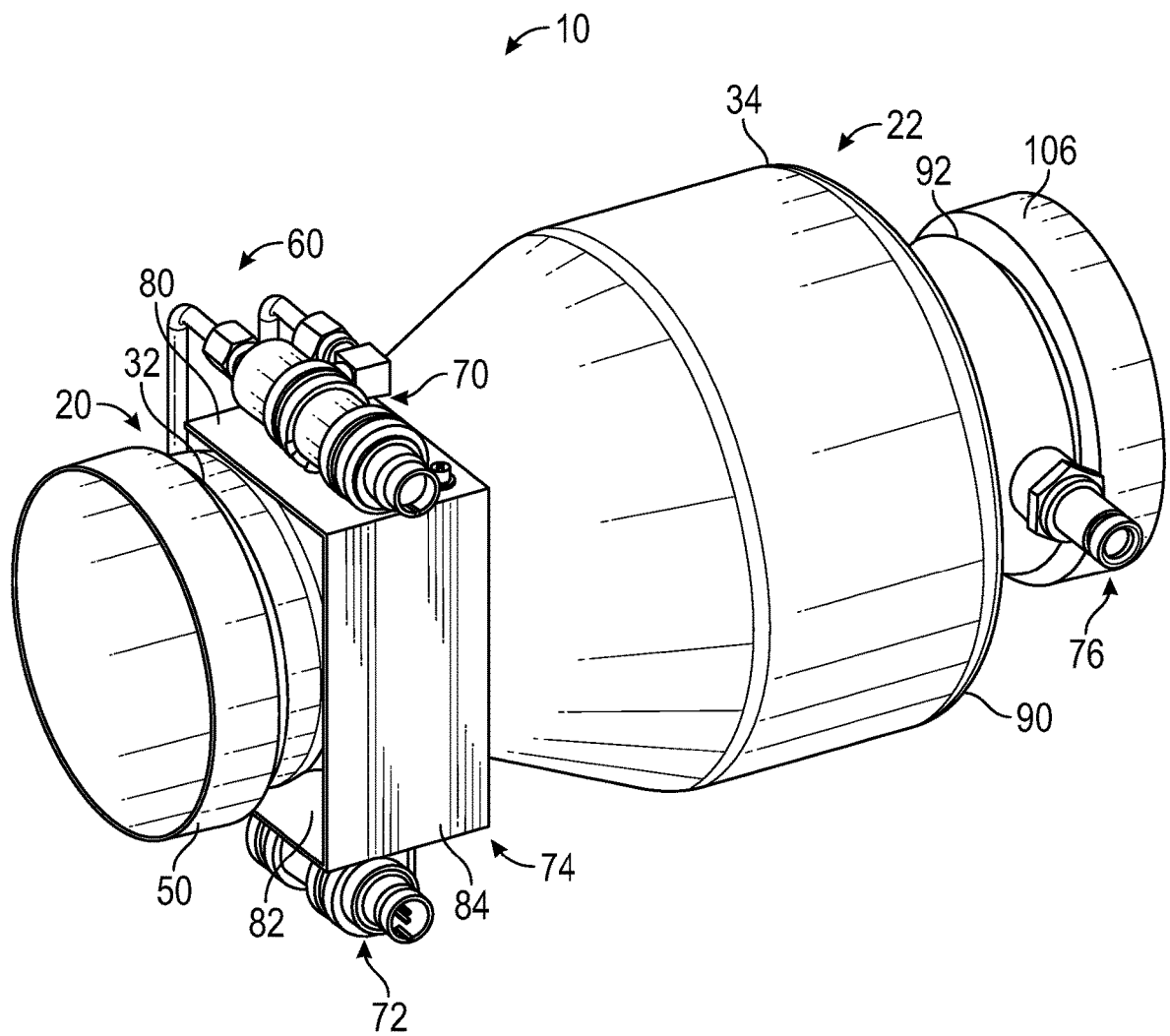
FIG. 1 is a perspective view of a flow sensing ozone converter.

FIG. 1 illustrates a flow sensing ozone converter 10 that may be provided as part of an aircraft or another vehicle having an environmental control system. The environmental control system receives input air from an input air source and provides output air to a location within the aircraft.

The flow sensing ozone converter 10 may be disposed upstream of the environment control system, downstream of the environment control system, or disposed within the environmental control system. The flow sensing ozone converter 10 is arranged to measure an air flow rate of air that may be received or provided by the environment control system as well as to convert ozone that may be present within the air to oxygen.

Figure 3:
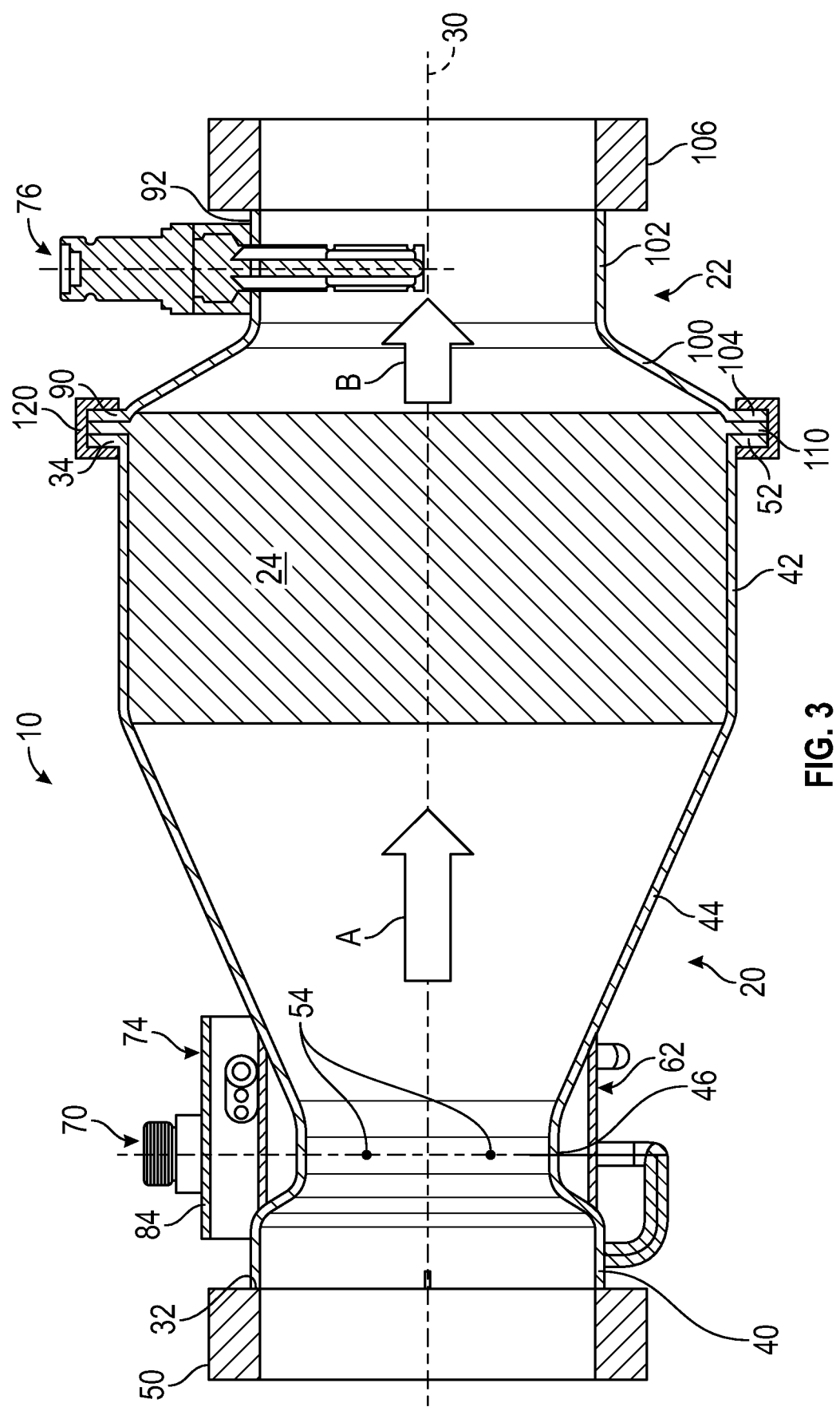
FIG. 3 is a partial cross-sectional view of the flow sensing ozone converter with the insulation blanket removed.

The flow sensing ozone converter 10 includes an inlet housing 20, an outlet housing 22, an ozone converter core 24, and an insulation blanket 26. As shown in FIG. 3, inlet air A enters through the inlet housing 20, flows through the ozone converter core 24, and outlet air B exits through the outlet housing 22. Some or all of the ozone contained within the inlet air A may be decomposed by the ozone converter core 24 such that the outlet air B has less ozone present than the inlet air A.

Figure 2:
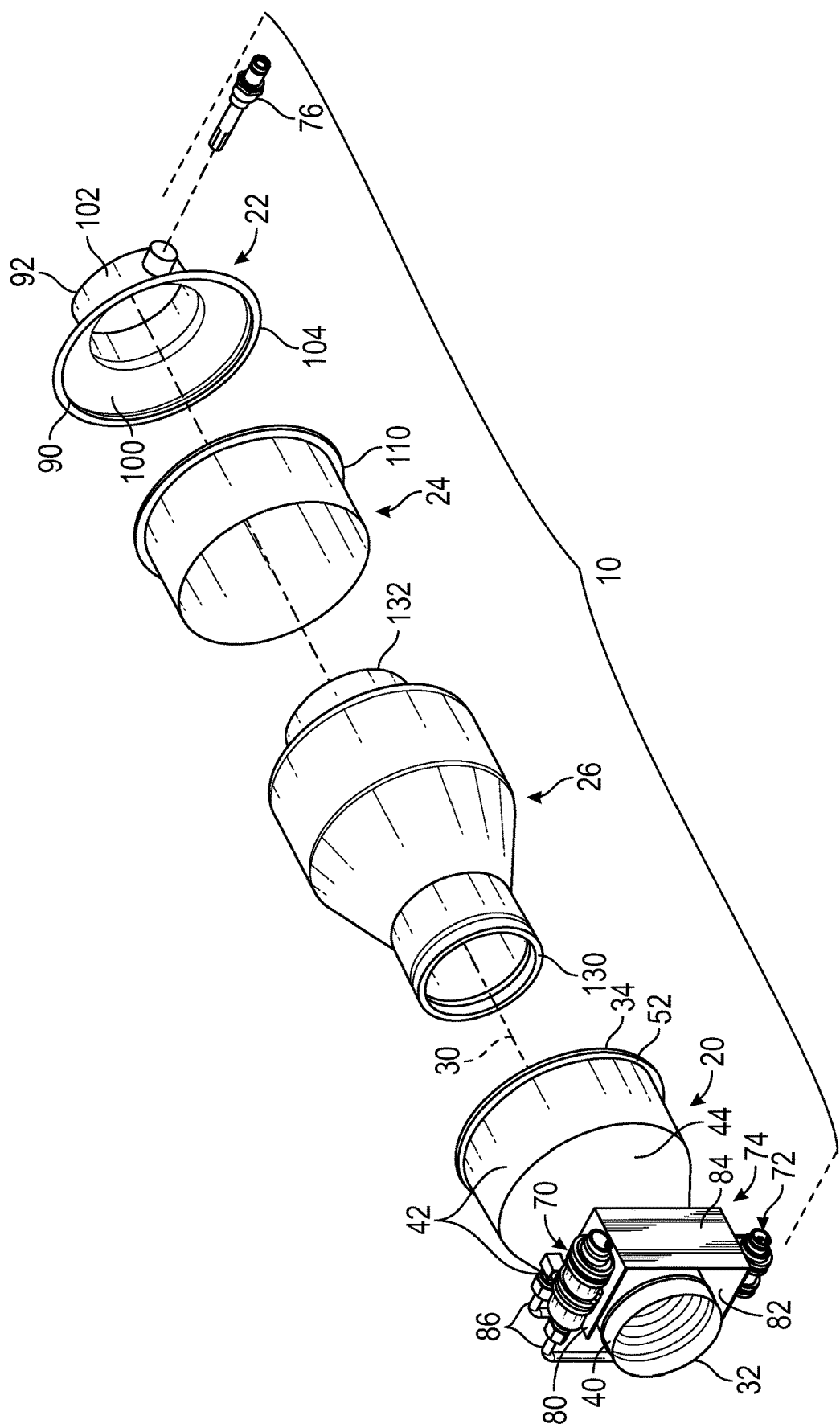
FIG. 2 is a disassembled view of the flow sensing ozone converter.

Referring to FIGS. 2 and 3, the inlet housing 20 extends along an axis 30 between a first inlet housing end 32 and a second inlet housing end 34. The inlet housing 20 includes an inlet section 40, an outlet section 42, a diffuser section 44, and a restriction section 46.

The inlet section 40 extends from the first inlet housing end 32 towards the second inlet housing end 34. The inlet section 40 defines an inlet flange 50 that aids in coupling the inlet housing 20 and the flow sensing ozone converter 10 to a component that delivers the inlet air A to the flow sensing ozone converter 10.

The outlet section 42 extends from the diffuser section 44 towards the second inlet housing end 34. The outlet section 42 may have a substantially constant cross-sectional form or diameter. The outlet section 42 of the inlet housing 20 may be provided with an inlet housing flange 52 that is disposed at the second inlet housing end 34.

The diffuser section 44 extends between the inlet section 40 and the outlet section 42. The diffuser section 44 may have a varying cross-sectional form or diameter along the axis 30 such that the cross-sectional form or diameter increases in a direction that extends from the inlet section 40 towards the outlet section 42.

The restriction section 46 is disposed between the inlet section 40 and the diffuser section 44. The restriction section 46 has a cross-sectional form or diameter that is less than the cross-sectional form or diameter of the inlet section 40, the outlet section 42, and/or the diffuser section 44. The restriction section 46 defines a throat of the inlet housing 20.

The restriction section 46 defines at least one pressure sense hole 54. The pressure sense hole 54 enables the inlet housing 20 to be fluidly connected to a flow sensor assembly 60. The flow sensor assembly 60 may include a piezometer ring 62 that is disposed about the restriction section 46 and is fluidly connected to the pressure sense hole 54. The piezometer ring 62 encapsulates a small volume (e.g. the restriction section 46) around the inlet housing 20 used to sense the average static throat pressure of the restriction section 46.

Referring to FIGS. 1 and 2, the flow sensor assembly 60 includes a first pressure sensor 70, a second pressure sensor 72, a heat shield 74, and a temperature sensor 76. The flow sensor assembly 60 is operatively connected to the inlet housing 20.

The first pressure sensor 70 and the second pressure sensor 72 are disposed on and are operatively connected to the heat shield 74 that is at least partially disposed about and is secured to the inlet housing 20. The first pressure sensor 70 and the second pressure sensor 72 may be disposed opposite each other. In at least one embodiment, the first pressure sensor 70 and the second pressure sensor 72 may be disposed side by side or adjacent to each other. In the embodiments shown, the heat shield 74 includes a first portion 80, a second portion 82 that is disposed opposite the first portion 80, and a third portion 84 that extends between the first portion 80 and the second portion 82. The heat shield 74 may have a generally U-shaped configuration such that the first portion 80 and the second portion 82 are disposed on opposite sides of the inlet housing 20 and are at least partially disposed about the piezometer ring 62. The heat shield 74 is positioned to thermally protect the first pressure sensor 70 and the second pressure sensor 72 from radiated or convective heat from the inlet housing 20.

The first pressure sensor 70 is disposed on the first portion 80 of the heat shield 74. The first pressure sensor 70 may be configured as a differential pressure sensor that monitors or measures a pressure drop or differential pressure across the inlet housing 20.

The second pressure sensor 72 is disposed on the second portion 82 of the heat shield 74. The second pressure sensor 72 may be configured as a static pressure sensor that monitors or measures a static pressure of the inlet housing 20. The first pressure sensor 70 and the second pressure sensor 72 are fluidly connected to the inlet housing 20 through pressure sense lines 86 that extend between the piezometer ring 62 and the first pressure sensor 70 and the second pressure sensor 72.

The temperature sensor 76 is operatively connected to the outlet housing 22. The temperature sensor 76 may be configured as an RTD temperature sensor. The temperature sensor 76 in conjunction with at least one of the first pressure sensor 70 and the second pressure sensor 72 aids in the measurement or monitoring of flow through or within the flow sensing ozone converter 10.

Referring to FIGS. 1-3, the outlet housing 22 extends along the axis 30 between a first outlet housing end 90 and a second outlet housing end 92. The outlet housing 22 includes a nozzle section 100 and an outlet housing outlet section 102.

The nozzle section 100 extends from the first outlet housing end 90 towards the second outlet housing end 92. The nozzle section 100 may be provided with an outlet housing flange 104 that is disposed at the first outlet housing end 90. The nozzle section 100 has a cross-sectional form or diameter that decreases in a direction that extends from the first outlet housing end 90 towards the second outlet housing end 92.

The outlet housing outlet section 102 extends from the nozzle section 100 towards the second outlet housing end 92. The temperature sensor 76 extends into the outlet housing outlet section 102. The outlet housing outlet section 102 may be provided with an outlet flange 106 that aids in coupling the outlet housing 22 and the flow sensing ozone converter 10 to a component that provides the outlet air B another component of the environmental control system or to a cabin or flight deck. The outlet housing outlet section 102 has a cross-sectional form or diameter that is substantially constant.

The ozone converter core 24 is at least partially received within at least one of the inlet housing 20 and/or the outlet housing 22. As shown in FIG. 3, the ozone converter core 24 is substantially disposed within the outlet section 42 of the inlet housing 20. The ozone converter core 24 is arranged to reduce ozone in the inlet air A.

The ozone converter core 24 is provided with an ozone converter flange 110. The ozone converter flange 110 is disposed between the second inlet housing end 34 and the first outlet housing end 90, such that the ozone converter flange 110 extends through an opening that is defined between the inlet housing flange 52 and the outlet housing flange 104. The ozone converter flange 110 is disposed between and abuts the inlet housing flange 52 and the outlet housing flange 104.

The inlet housing 20, the outlet housing 22, and the ozone converter core 24 are removably coupled to each other at their respective flanges, e.g. the inlet housing flange 52, the outlet housing flange 104, and the ozone converter flange 110, to facilitate removal and/or replacement of the ozone converter core 24. The inlet housing 20, the outlet housing 22, and the ozone converter core 24 may be coupled to each other by a removable coupling 120. The removable coupling 120 may be a V-band coupling, a clamp, a bolt that extends through the inlet housing flange 52, the outlet housing flange 104, and the ozone converter flange 110, or any other type of removable coupling.

The insulation blanket 26 is arranged to be disposed about the inlet housing 20 and the outlet housing 22. The insulation blanket 26 is arranged to extend between the inlet flange 50 and the outlet flange 106. A first end 130 of the insulation blanket 26 abuts or is disposed adjacent to the inlet flange 50 and a second end 132 of the insulation blanket 26 abuts or is disposed adjacent to the outlet flange 106.

The insulation blanket 26 is arranged to maximize the ozone converter core 24 conversion performance as well as minimizing external heat losses. The insulation blanket 26 may be made of multiple pieces that are joined together and may be permanently attached to the inlet housing 20 and the outlet housing 22.

The flow sensing ozone converter 10 provides a compact single line replaceable unit having integrated flow sensing and oxygen removal components. The single line replaceable unit offers a significant overall volume reduction that is advantageous to packaging an aircraft ECS system within a restrictive envelope. Furthermore, the flow sensing ozone converter 10 simplifies removal and installation of the ozone converter core 24 due to the removable coupling between the inlet housing 20, the outlet housing 22, and the ozone converter core 24.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flow sensing ozone converter, comprising:
    an inlet housing extending between a first inlet housing end and a second inlet housing end having an inlet housing flange;
    an outlet housing extending between a first outlet housing end having an outlet housing flange and a second outlet housing end;
    an ozone converter core at least partially received within the inlet housing, the ozone converter is provided with an ozone converter flange that abuts the inlet housing flange and the outlet housing flange;
    a flow sensor assembly that is operatively connected to the inlet housing, wherein the flow sensor assembly includes a heat shield that is secured to the inlet housing;
    a first pressure sensor disposed on a first portion of the heat shield; and
    a second pressure sensor disposed on a second portion of the heat shield that is disposed on a side of the inlet housing opposite the first portion of the heat shield.

2. The flow sensing ozone converter of claim 1, wherein the inlet housing, the outlet housing, and the ozone converter core are removably coupled to each other at the inlet housing flange, the ozone converter flange, and the outlet housing flange.

3. The flow sensing ozone converter of claim 1, wherein the heat shield is at least partially disposed about the inlet housing.

4. The flow sensing ozone converter of claim 1, further comprising an insulation blanket that is disposed about the inlet housing and the outlet housing.

5. A flow sensing ozone converter, comprising:
    an inlet housing extending between a first inlet housing end and a second inlet housing end;
    an outlet housing extending between a first outlet housing end and a second outlet housing end;
    an ozone converter core that is removably coupled to at least one of the inlet housing and the outlet housing, the ozone converter core having an ozone converter flange that is disposed between the second inlet housing end and the first outlet housing end, wherein the ozone converter is at least partially disposed within the inlet housing;
    a flow sensor assembly that is operatively connected to the inlet housing, wherein the flow sensor assembly includes a heat shield that is secured to the inlet housing;
    a first pressure sensor disposed on a first portion of the heat shield; and
    a second pressure sensor disposed on a second portion of the heat shield that is disposed on a side of the inlet housing opposite the first portion of the heat shield.

6. The flow sensing ozone converter of claim 5, wherein the inlet housing is provided with an inlet housing flange that is disposed at the second inlet housing end.

7. The flow sensing ozone converter of claim 6, wherein the outlet housing is provided with an outlet housing flange that is disposed at the first outlet housing end.

8. The flow sensing ozone converter of claim 7, wherein the ozone converter flange is disposed between the inlet housing flange and the outlet housing flange.

9. The flow sensing ozone converter of claim 5, wherein the inlet housing includes:
   an inlet section extending from the first inlet housing end towards the second inlet housing end;
   an outlet section extending from the second inlet housing end towards the first inlet housing end; and
   a diffuser section extending between the inlet section and the outlet section.

10. The flow sensing ozone converter of claim 9, wherein a restriction section is disposed between the inlet section and the diffuser section.

11. The flow sensing ozone converter of claim 10, wherein the restriction section defines at least one pressure sense hole.

12. The flow sensing ozone converter of claim 5, wherein the outlet housing includes:
   a nozzle section extending from the first outlet housing end towards a second outlet housing end; and
   an outlet housing outlet section extending from the nozzle section to the second outlet housing end.

13. The flow sensing ozone converter of claim 12, further comprising a temperature sensor that is operatively connected to the outlet housing.

14. A flow sensing ozone converter, comprising:
   an inlet housing extending between a first inlet housing end and a second inlet housing end;
   an outlet housing extending between a first outlet housing end and a second outlet housing end;
   an ozone converter core that is removably coupled to at least one of the inlet housing and the outlet housing, the ozone converter core having an ozone converter flange that is disposed between the second inlet housing end and the first outlet housing end, wherein the ozone converter is at least partially disposed within the inlet housing;
   wherein the inlet housing includes an inlet section extending from the first inlet housing end towards the second inlet housing end, an outlet section extending from the second inlet housing end towards the first inlet housing end, and a diffuser section extending between the inlet section and the outlet section;
   wherein the outlet housing includes a nozzle section extending from the first outlet housing end towards a second outlet housing end, and an outlet housing outlet section extending from the nozzle section to the second outlet housing end,
   wherein the inlet housing is provided with an inlet housing flange that is disposed at the second inlet housing end, wherein the outlet housing is provided with an outlet housing flange that is disposed at the first outlet housing end, wherein the ozone converter flange is disposed between the inlet housing flange and the outlet housing flange;
   a flow sensor assembly that is operatively connected to the inlet housing, wherein the flow sensor assembly includes a heat shield that is secured to the inlet housing and disposed about a portion of the inlet housing;
   a first pressure sensor disposed on a first portion of the heat shield; and
   a second pressure sensor disposed on a second portion of the heat shield that is disposed on a side of the inlet housing opposite the first portion.

* * * * *